(No Model.)

P. HAMEL.
VEHICLE JOURNAL AND BOX.

No. 305,387. Patented Sept. 16, 1884.

WITNESSES:
L. Holmbo
P. C. Dyrenforth

INVENTOR
Peter Hamel
BY
Price & Fisher
ATTORNEYS

N. PETERS, Photo-Lithographer, Washington, D. C.

UNITED STATES PATENT OFFICE.

PETER HAMEL, OF HOUGHTON, MICHIGAN.

VEHICLE JOURNAL AND BOX.

SPECIFICATION forming part of Letters Patent No. 305,387, dated September 16, 1884.

Application filed April 7, 1884. (No model.)

*To all whom it may concern:*

Be it known that I, PETER HAMEL, of Houghton, in the county of Houghton and State of Michigan, have invented certain new and useful Improvements in Vehicle Journals and Boxes, of which I do declare the following to be a full, clear, and exact description, reference being had to the accompanying drawings, forming part of this specification.

My present invention has for its object to provide an axle-journal and journal-box for the wheels of vehicles of such improved construction that the wheels shall be held on the axles with greater certainty against lateral movement, and a more effective lubrication of the journal and its protection from dirt and consequent wear shall be secured. This object of invention I have attained by the construction of journal and box hereinafter described, illustrated in the accompanying drawings, and particularly defined in the claims at the end of this specification.

Figure 1:
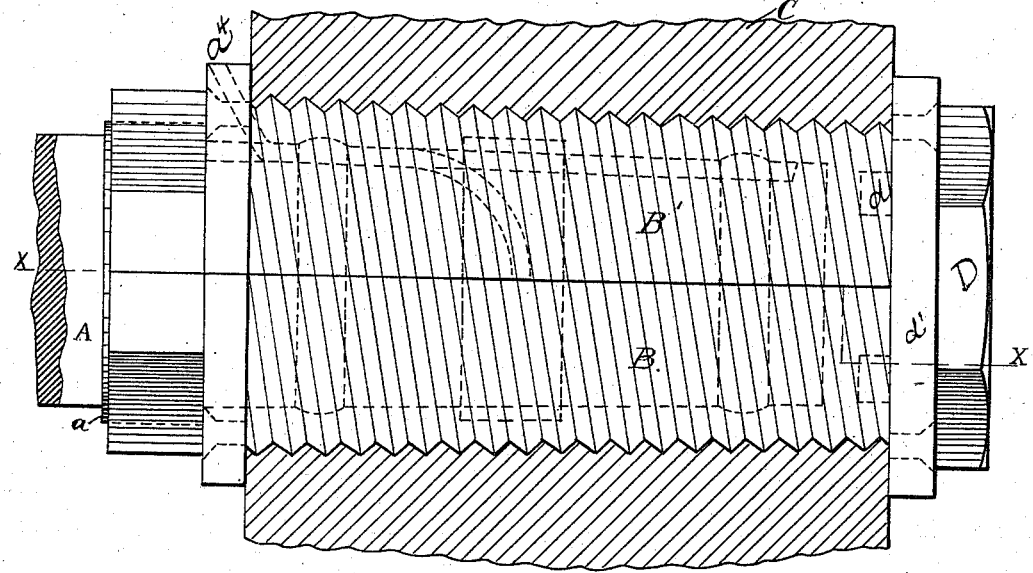
Figure 2:
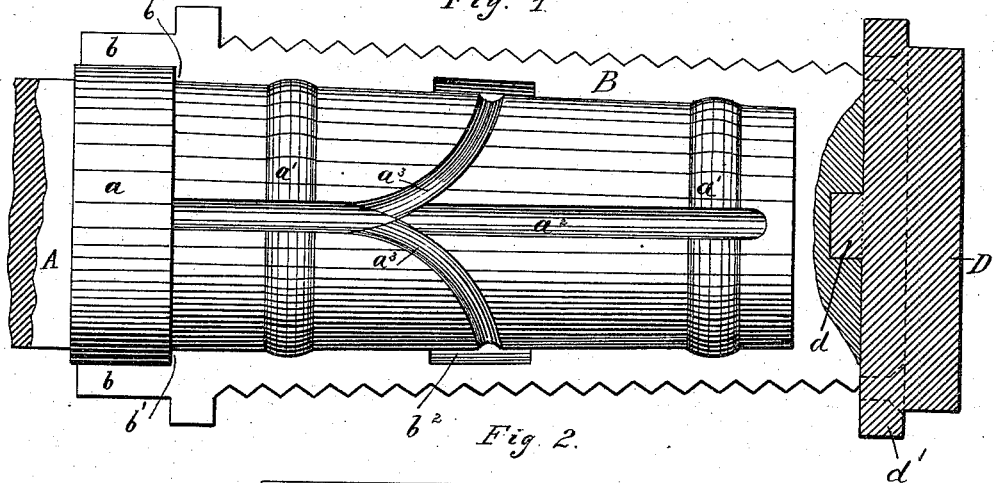
Figure 3:
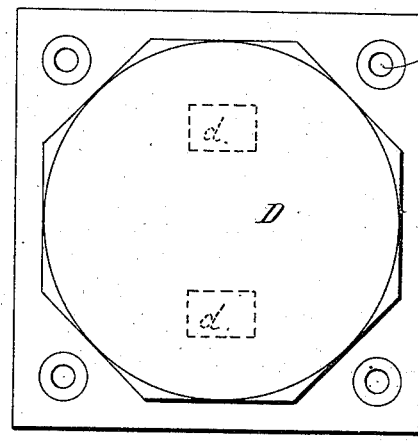

Figure 1 is a view in side elevation of a construction embodying my invention, the journal being shown in dotted lines, and the wheel-hub being shown in section. Fig. 2 is a plan view of the axle-journal, one of the journal-box sections being removed, and the cap and a portion of the remaining box-section being shown in section. Fig. 3 is a front view of the hub-cap detached.

A designates the usual square axle, having the annular guard-shoulder $a$, and having on its journal portion the ribs $a'$ and the axial lubricating ducts or channels $a^2$, from which lead the peripheral duct or channel $a^3$, these several channels being supplied with suitable lubricant through the orifice $a^4$, formed in the journal-box, as shown by dotted lines in Fig. 1. Over the axle-journal fits the journal-box, that is formed of the sections B B', each having a flange, $b$, adapted to fit over the guard-shoulder $a$ on the axle, the outer surface of these flanges being polygonal, to enable the same to be grasped by a wrench-bar when placing the wheel on the axle-box or removing it therefrom. A shoulder, $b'$, on the axle-box bears against the shoulder $a$ and aids to hold the box in place. Grooves are formed on the inner faces of the axle-box sections in such position as to fit over the ribs $a'$, and a broad shallow groove, $b^2$, is formed in the box, as shown, to come opposite the peripheral channel of the journal when the box is in position thereon. The outer surface of the axle-box is screw-threaded, to enable it to hold the hub C, which is correspondingly screw-threaded, to fit thereon. The ends of the journal-box sections B and B' are closed, as shown, thus guarding against the escape of the lubricant, holding the hub in place more securely, and preventing dust or dirt from fouling the journal, and in these closed ends are formed suitable seats to receive the stops $d$, projecting from the hub-cap D. The body portion D of this cap is preferably of polygonal shape, and is provided with the broad flange $d'$, having holes $d^2$, to receive screws that enter the hub and hold the cap in place thereon.

From the construction of parts, as thus defined, it will be seen that when the journal-box has been placed upon the journal and the hub has been screwed thereon the sections of this box will be firmly held together, and the ribs $a'$ will effectually prevent its withdrawal from the journal. The cap D, being attached to the hub, and having the stops $d$ entering the seats in the ends of the journal-box, will securely guard the wheel against accidental displacement. The channels $a^2$, $a^3$, and $b^2$ will serve to deliver the lubricant to the journal in suitable quantity, the channel $b^2$ acting as a reservoir therefor, and the necessity for frequent lubrication of the axle-journals is entirely avoided. By this construction not only is the wheel securely held in place in such manner as to avoid all danger of lateral movement and loosening of parts, but also an efficient means of lubricating the axle-journal and protecting the same from grit and consequent wear is secured.

Having thus described my invention, what I claim as new, and desire to secure by Letters Patent, is—

1. A wheel-hub journal-box formed of semi-cylindrical sections, each section having a closed outer end, substantially as described.

2. A wheel-hub journal-box formed of semi-cylindrical sections, each section having its main body exteriorly screw-threaded, and having a closed outer end and a semi-polygonal rear flange, substantially as described.

3. The combination, with the axle-journal, of an externally-threaded axle-journal box formed of semi-cylindrical sections, adapted to pass through the wheel-hub, and a cap adapted for attachment to the hub, and to engage with the end of the axle-journal box and prevent its withdrawal from the hub, substantially as described.

4. The combination, with the axle-journal, of the journal-box externally screw-threaded and having seats in its closed end, and a cap for holding the wheel in place, having stops adapted to enter said seats, substantially as described.

5. The combination, with the axle-journal having the ribs and grooves, arranged substantially as shown, of the journal-box having the rib-seats and the broad channel, substantially as described.

In testimony whereof I have hereunto set my hand this 15th day of March, 1884.

PETER HAMEL.

Witnesses:
CHARLES BRUNEAU,
JOHN SULLIVAN.